United States Patent [19]
Schmidt

[11] Patent Number: 5,297,497
[45] Date of Patent: Mar. 29, 1994

[54] SCRAPER ATTACHMENT FOR DEPTH GAUGE WHEEL ON SEED PLANTER

[76] Inventor: LaVern D. Schmidt, P.O. Box 234, Montezuma, Kans. 67867

[21] Appl. No.: 972,548

[22] Filed: Nov. 6, 1992

[51] Int. Cl.$^5$ .............................. B60S 1/68; A01B 15/16
[52] U.S. Cl. ...................................... 111/200; 280/855; 172/610; 111/135
[58] Field of Search ................ 180/6.7, 8.7, 9.1; 280/855, 856; 172/610, 558; 111/200, 134-137, 926

[56] References Cited

U.S. PATENT DOCUMENTS

| | | | |
|---|---|---|---|
| 1,877,005 | 9/1932 | Merklin | 280/855 |
| 1,924,626 | 8/1933 | Roddel | 280/855 |
| 2,082,141 | 6/1937 | Beran | 280/855 |
| 2,454,002 | 11/1964 | Paluck | 280/855 |
| 4,430,952 | 2/1984 | Murray | 111/85 |

*Primary Examiner*—Peter Nerbun
*Assistant Examiner*—Paul C. Lewis
*Attorney, Agent, or Firm*—Shook, Hardy & Bacon

[57] ABSTRACT

A scraper is provided for use on depth gauge wheels provided on planters for row crops such as corn, soybeans, cotton, beans, peanuts and the like. The scraper includes a scraper blade which is mounted at one end portion of an elongated arm for contacting the outer circumference of the depth gauge wheel. The other end of the arm is mounted by a bearing assembly to a hub provided on the depth gauge wheel. The bearing assembly is mounted coaxially with the axis of rotation of the wheel so that the arm remains stationary as the wheel rotates. In addition, the scraper blade remains in contact with the wheel as the wheel is moved in vertical and fore-and-aft directions. A support bolt is also received within an elongated opening presented by a U-shaped member mounted at the free end portion of the scraper arm to stabilize and reduce unnecessary movement of the scraper arm.

15 Claims, 2 Drawing Sheets

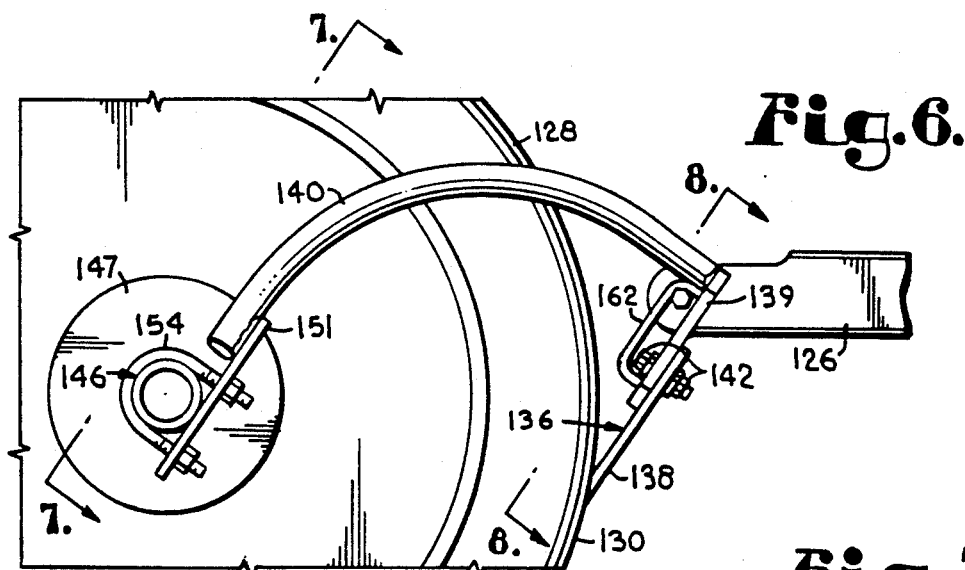
Fig.6.
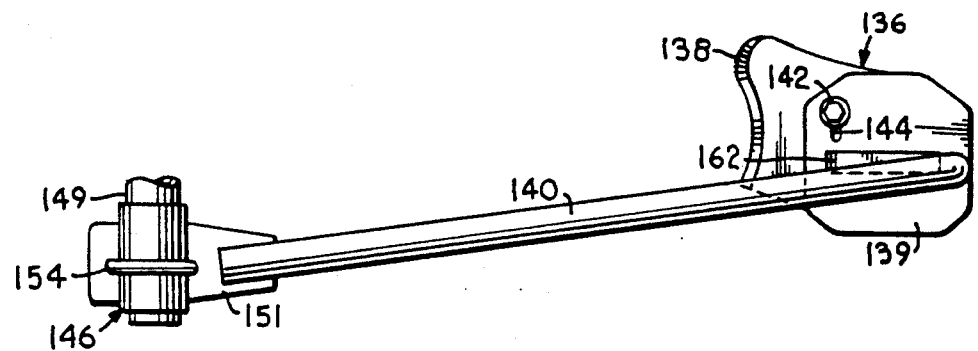
Fig.7.
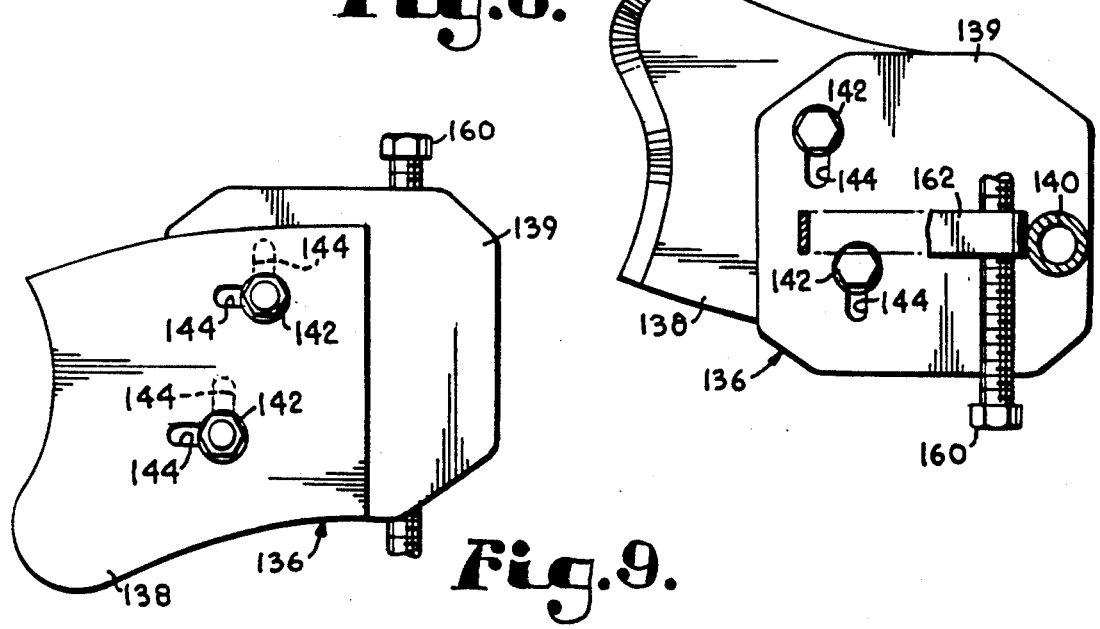
Fig.8.
Fig.9.

SCRAPER ATTACHMENT FOR DEPTH GAUGE WHEEL ON SEED PLANTER

BACKGROUND OF THE INVENTION

The present invention relates in general to seed planters, and, more particularly, to an attachment for scraping mud and other debris from a depth wheel gauge used to adjust the depth at which seeds are planted.

The planting of seed of row crops such as corn, soybeans, peanuts, cotton and the like has become an exacting procedure which requires specialized equipment to open the soil, position the seed in the opened trench and then cover the seed with soil. For example, seed planters are available that utilize pairs of disc-shaped blades to open V-shaped trenches to a preselected depth, a seed delivery apparatus to deliver seed from a hopper to the trench at regularly spaced intervals, and a pair of trailing pack wheels that close the trench and pack the soil in a manner to prevent erosion and conserve moisture. Planters of this type are particularly well suited for use in ridge-till, minimum-till and no-till applications.

The described planters include a depth gauge wheel which is positioned beside each opening blade pair to allow the depth of penetration of the opening blades into the soil to be gauged and precisely controlled. The depth gauge wheel normally contacts a portion of the opening blade to sharpen its cutting edge and to scrape dirt and debris from the side of the blade as it rotates during planting operations. Removal of the dirt from the opening blades is necessary to ensure that the trench is properly formed for optimum seed placement. In addition, it is important to prevent a build up of dirt on the opening blades which might interfere with the operation of the depth gauge wheels.

To assist in the removal of the soil from the opening blades on seed planters, rotary scrapers are available which mount to the planter frame and extend between the opening blade and the adjacent depth gauge wheel. The scraper operates by bearing against the outside face of the blade to remove soil from the blade as it rotates. Because there is no relative vertical movement between the opening blade and the frame to which the scraper is fixed, it is relatively easy to mount scrapers of this type.

It is also important to prevent any build up of soil on the ground contacting surface of the depth gauge wheels in order to ensure that the trench is opened to the proper depth. Certain types of depth gauge wheels are also contoured along their outer circumference to impart a specific profile to the soil adjacent the trench and thereby prevent soil from falling into the trench where it would interfere with the positioning and optimum germination of the seed. Particularly in moist or sticky soil conditions, soil will build up on the wheel and impede the proper preparation of the soil ridge adjacent the trench as well as gauging the depth of the trench. This problem is particularly acute with planting techniques in which the soil is prepared concurrently with planting because the soil does not have an opportunity to dry out before planting of the seed. Despite the importance of keeping the depth gauge wheel free from the build up of soil, mounting a scraper on the planter frame for such purpose, such as is done with conventional scrapers for the opening blades, is impracticable because the degree of movement between the vertically adjustable wheel and the planter frame would prevent the scraper from maintaining contact with the wheel as it is repositioned.

A need has thus developed for a scraper which can be mounted to maintain engagement with the outer circumference of the depth gauge wheel as it is placed in various vertical and fore-and-aft positions in relation to the remainder of the planter.

SUMMARY OF THE INVENTION

It is an object of this invention to provide a scraper attachment for a seed planter to scrape dirt from the outer circumference of a depth gauge wheel to ensure that the wheel operates properly to gauge the depth at which the soil opening blades penetrate the soil.

It is also an object of this invention to provide a scraper attachment for a seed planter to scrape dirt from the outer circumference of a contoured depth gauge wheel to prevent the dirt from interfering with the formation of the desired soil profile adjacent the trench opened by the soil opening blades.

It is a further object of this invention to provide a scraper attachment for a seed planter which is mounted on the planter in a manner to move with the depth gauge wheel so that the scraper is maintained in contact with the depth gauge wheel during vertical as well as fore-and-aft movement of the wheel.

To accomplish these and other related objects of the invention, a scraper attachment is provided comprising:
- a scraper blade presenting an edge for contacting an outer circumference of a depth gauge wheel;
- an elongated arm mounting the scraper blade;
- a mount for coupling the elongated arm with the depth gauge wheel and permitting relative rotative movement between the depth gauge wheel and the elongated arm to permit the arm to remain generally stationary as the depth gauge wheel rotates, whereby said edge of the scraper blade is maintainable in contact with the outer circumference of the depth gauge wheel as the depth gauge wheel rotates; and
- a stabilizing member mounted on the elongated arm at a position remote from said mount.

Desirably, the stabilizing member presents an elongated opening for receiving a support bolt and permitting sliding movement of the support bolt along said member when the scraper is mounted on the depth gauge wheel and said wheel moves in a vertical or fore-and-aft direction, whereby said scraper blade is maintainable in contact with said outer circumference of the depth gauge wheel as it moves in the vertical and fore-and-aft directions.

The scraper mount preferably includes a hub for mounting on the depth gauge wheel and a bearing assembly for coupling with the hub and which includes a shaft mounted for rotation coaxially with an axis of rotation of the depth gauge wheel when the hub is mounted thereon.

BRIEF DESCRIPTION OF THE DRAWINGS

In the accompanying drawings which form a part of the specification and in which like reference numerals are used to indicate like parts in the various views:

FIG. 6 is a fragmentary side elevational view of another embodiment of a scraper mounted on a depth gauge wheel;

FIG. 7 is a top plan view of the scraper shown in FIG. 6;

FIG. 8 is an enlarged top plan view of an end portion of the scraper and a support bolt with portions of the scraper and bolt broken away for purposes of illustration; and FIG. 9 is a bottom plan view of the scraper and bolt, the bolt being shown in fragment.

DESCRIPTION OF THE PREFERRED EMBODIMENT

Figure 1:
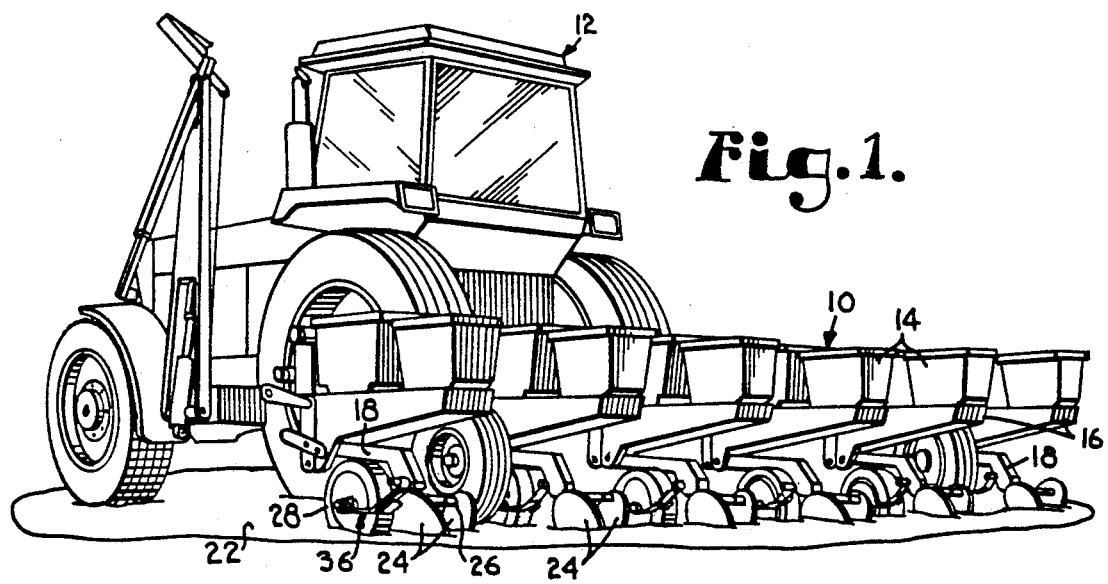
FIG. 1 is a rear perspective view of a tractor and seed planter to which one embodiment of a depth gauge wheel scraper in accordance with the present invention is attached.

Referring now to the drawings in greater detail, and initially to FIG. 1, a seed planter designated generally by the numeral 10 is shown attached to a tractor 12. Planter 10 broadly comprises a plurality of seed hoppers 14 which are supported on upper frame extensions 16. The planter 10 also includes a plurality of lower frame members 18 positioned beneath the upper frame extensions 16.

Figures 2, 5:
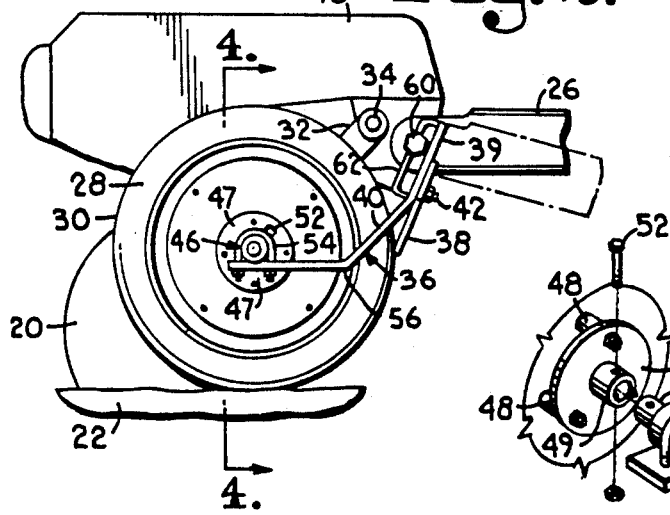
FIG. 2 is a fragmentary side elevational of the planter showing the scraper mounted on the depth gauge wheel and with phantom lines illustrating the movement of the pack wheel frame which carries a bolt extension that supports a portion of the scraper.
FIG. 5 is a fragmentary side perspective view of the scraper.
Figure 3:
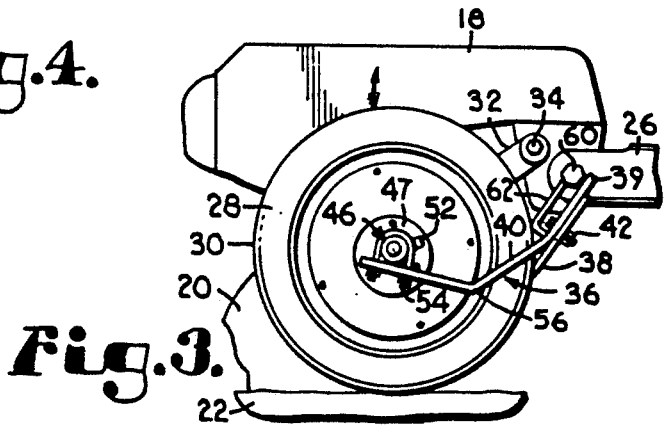
FIG. 3 is a fragmentary side elevational view of the planter similar to the view shown in FIG. 2 but with the depth gauge wheel shown moved to an elevated position and the scraper being maintained in contact with the outer circumference of the wheel.

Turning additionally to FIGS. 2-3, it can be seen that each lower frame member 18 mounts a disc-shaped soil opening blade 20. Preferably, a pair of such blades 20 are mounted side by side and are inclined to present a V-shaped configuration which serves to open a V-shaped trench in soil 22. A pair of similarly inclined pack wheels 24 are mounted on a frame extension 26 which extends rearwardly from each lower frame member 18. The pack wheels 24 close the trench opened by blades 20 following delivery of seed from hoppers 14 to the trench. The pack wheels 24 are particularly designed to compact the soil immediately overlying the planted seed and also to leave a mound of loose soil mulch overlying the compacted soil to facilitate retention of moisture in the soil.

Each lower frame member 18 of planter 10 additionally mounts a depth gauge wheel 28 immediately adjacent and in contact with a portion of one of soil opening blades 20 to maintain the sharpness of the cutting edge of the blade. The depth wheel gauge 28 includes a contoured outer circumference 30 which is designed to prevent soil from falling back into the trench opened by soil opening blades 20 where it would interfere with the proper positioning and germination of the seeds. The wheel 28 also serves as a scraper to remove dirt from the outer face of soil opening blade 20.

Each depth gauge wheel 28 is mounted on a pivot arm 32 which is secured to the associated lower frame member 18 by a pin 34 which allows the wheel 28 to pivot about pin 34. The pivoting movement of the wheel 28 allows it to function as a gauge of the depth to which the soil opening blade 20 extends into the ground.

Figure 4:
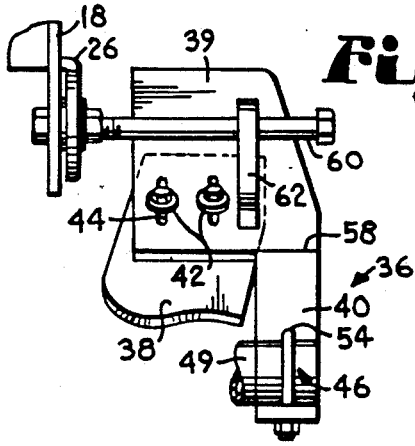
FIG. 4 is a fragmentary elevational view of the scraper taken in vertical section along line 4—4 of FIG. 2 in the direction of the arrows.

The heretofore described components and operation of seed planter 10 are conventional and well-known to those of skill in the art. Turning additionally to FIGS. 4-5, one embodiment of a novel depth gauge wheel scraper 36 in accordance with the present invention will be described. Scraper 36 includes a scraper blade 38 which is mounted to an end portion 39 of an elongated arm 40 by a pair of nut and bolt assemblies 42. A closed end slot 44 is provided in the end portion 39 of arm 40 in association with each nut and bolt assembly 42 to allow for variable positioning of the scraper blade 38 in relation to the arm 40. The other end of arm 40 is coupled by a bearing assembly 46 to a hub 47 which is mounted to an outer face of depth gauge wheel 28. A plurality of spacers 48 are provided to space the hub 47 from the face of the wheel 28. The hub 47 includes a collar 49 which receives a stub shaft 50 of the bearing assembly 46. A bolt 52 extends through the collar 49 and stub shaft 50 to prevent detachment of the arm 40 from hub 47. The bearing assembly 46 is secured to the arm 40 by a U-bolt 54 or other suitable means.

The scraper arm 40 is formed from a suitably rigid elongated piece of flat metal which is widened at end portion 39 to allow placement of the scraper blade 38 against the outer circumference 30 of wheel 28 across its entire width. Preferably, the edge of scraper blade 38 is complementally formed to follow the contours of the wheel outer circumference 30. The arm 40 may include a cutout 55 along an edge adjacent the wheel 28 to reduce the opportunity for debris to accumulate between the arm and the wheel and interfere with the proper operation of the scraper 36. The arm 40 also includes a pair of bends 56 and 58 which bring the free end of arm 40 into position adjacent a support bolt 60 which extends outwardly from pack wheel frame 26. Desirably, the support bolt 60 simply replaces the shorter bolt conventionally used to secure the pack wheel frame 26 to lower frame member 18. The support bolt 60 is received within and moveable along an opening formed by an elongated U-shaped member 62 which is mounted to a face of the end portion 39 of arm 40. The U-shaped member 62 and support bolt 60 thus cooperate to stabilize the free end of arm 40 while still permitting the scraper blade 38 to be maintained in contact with the outer circumference 30 of depth gauge wheel 28 as the wheel pivots about pivot pin 34. Advantageously, the bends 56 and 58 in arm 40 allow the end portion 39 of arm 40 to be located so that the scraper blade 38 tangentially contacts the outer circumference 30 of depth gauge wheel 28 at an acute angle.

In use, the scraper 36 functions to remove dirt and debris from the outer circumference 30 of the depth gauge wheel 28 so that precise control over the depth of the trench formed by soil opening blades 20 can be maintained. The dirt is removed from the wheel as the weight of the scraper 40 urges the edge of the scraper blade 38 against the outer circumference 30 of the depth gauge wheel 28. Advantageously, the scraper blade 38 is positioned at an acute angle to the wheel at locations less than approximately 90 degrees from the area of contact of the wheel with the ground or soil 22. Placement of the scraper blade 38 in this manner removes the dirt from the wheel 28 at a point close to the ground and before it has obtained a forward momentum as a result of rotation of the wheel 28. This serves to reduce the opportunity for the dirt to be flung forwardly where it might collect between the wheel 28 and the soil opening blades 20 and interfere with the proper operation of the planter 10.

The bearing assembly 46 permits relative rotation between the scraper arm 40 and the depth gauge wheel 28 and, because the bearing assembly 46 is mounted coaxially with the rotation axis of the depth gauge wheel 28, the scraper arm 40 remains stationary as the wheel 28 rotates. Moreover, because the scraper 36 is mounted directly to the depth gauge wheel 28, the scraper blade 38 remains in contact with the wheel outer circumference 30 even as the wheel 28 pivots about pin 34. It will be appreciated that this vertical and fore-and-aft movement of the depth gauge wheel 28 would otherwise cause separation of the scraper blade 38 from contact with the wheel 28 and would allow dirt to remain on the wheel, especially in the wet soil conditions encountered in modern planting techniques.

The scraper 36 is stabilized by the provision of the support bolt 60 which contacts the undersurface of the U-shaped member 62 mounted on the free end portion 39 of the scraper arm 40. The use of the U-shaped member 62 is particularly noteworthy in this regard because it presents an elongated opening which accommodates relative movement between the U-shaped member and the support bolt 60 as the depth gauge wheel 28 is repositioned, such as is illustrated in FIGS. 2 and 3. The scraper 36 thus is able to automatically adjust to movement of the wheel 28 and maintain contact between the scraper blade 38 and wheel outer circumference 30.

The scraper blade 38 can be readily adjusted on the scraper arm end portion 39 by simply loosening the nut and bolt assemblies 44 and sliding the blade to the desired position before retightening the nut and bolts. The scraper blade 38 can also be removed for replacement in this same fashion. For example, the scraper 36 may be used with depth gauge wheels that do not have a contoured outer circumference and a flat-edged scrapper blade can be substituted for the contoured blade 38. Likewise, the scraper blade 38 can be replaced when it becomes worn out.

It will also be appreciated that the scraper 36 can be used with multiple depth gauge wheel assemblies by simply increasing the width of the end portion 39 of the scraper arm 36 so that multiple scraper blades 38 can be mounted thereon. As an example, it is common for double depth gauge wheel assemblies to be utilized on planters operating in certain soil conditions. The scraper 36 can be readily adapted for use with such double wheel assemblies by providing a wider end portion 39 so that two scraper blade 38 can be mounted side by side to contact the respect wheels. This is contemplated by and is within the scope of the invention. Additionally, it will be apparent that the scraper 36 can be used when mechanized planter 10 is being utilized for purposes other than the planting of seed.

Turning additionally to FIGS. 6-9, a preferred embodiment of a scraper in accordance with the present invention is represented broadly by the numeral 136. Scraper 136 is similar to scraper 36 previously described and like reference numerals proceeded by the prefix "1" are used to refer to those like parts. Scraper 136 has an elongated arm 140 which connects a scraper blade mounting plate 139 to a bearing assembly 146 which is mounted to a hub 147 secured to an outer face of a depth gauge wheel 128. A scraper blade 138 is mounted to the plate 139 by nut and bolt assembles 142. Closed end slots 144 are provided in the mounting plate 139 to allow lateral adjustment of the scraper blade 138 in relation to the plate 139. Similar slots 144 are provided in the scraper blade 138 itself to allow for up and down adjustment of the blade 138 in relation to plate 139.

The elongated arm 140 differs from arm 40 previously described in that it is of tubular construction and arches upwardly from the bearing assembly 146 when the scraper 136 is mounted on the depth gauge wheel 128. In addition, the arm 140 is secured to the mounting plate 139 at an upper edge thereof. The arm 140 can be mounted to the bearing assembly 146 in any suitable fashion. As illustrated, the end portion of the arm 140 is welded to a plate 151 which is connected by a U-bolt 154 to a collar 149 of the bearing assembly 146.

The scraper 136 can be utilized in the same manner as the scraper 36 previously described and has the same advantages attendant thereto. Notably, the positioning of the elongated arm 140 above the axis of rotation of the depth gauge wheel 128 and the tubular construction of the arm reduce the opportunity for mud or other debris to accumulate on the arm and interfere with proper operation of the scraper 136.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A scraper for a depth gauge wheel mounted by a pivot arm to a frame of a seed planter and permitting movement of the depth gauge wheel in vertical and fore-and-aft directions, said scraper comprising:
    a scraper blade presenting an edge for contacting an outer circumference of the depth gauge wheel;
    an elongated arm mounting the scraper blade;
    a mount for coupling the elongated arm with the depth gauge wheel and permitting relative rotative movement between the depth gauge wheel and the elongated arm to permit the arm to remain generally stationary as the depth gauge wheel rotates, whereby said edge of the scraper blade is maintainable in contact with the outer circumference of the depth gauge wheel as the depth gauge wheel rotates; and
    means for stabilizing the elongated arm at a position remote from said mount and including a member presenting an elongated opening for receiving a support bolt and permitting sliding movement of the support bolt along said member when the scraper is mounted on the depth gauge wheel and said wheel moves in the vertical or fore-and-aft direction, whereby said scraper blade is maintainable in contact with said outer circumference of the depth gauge wheel as it moves in the vertical and fore-and-aft directions.

2. The scraper as set forth in claim 1, wherein said mount includes a hub for mounting on the depth gauge wheel and a bearing assembly for coupling with the hub and which includes a shaft mounted for rotation coaxially with an axis of rotation of the depth gauge wheel when the hub is mounted thereon.

3. The scraper as set forth in claim 2, wherein said scraper blade is variably positionable on said elongated arm.

4. The scraper as set forth in claim 2, wherein said elongated arm is configured to position said scraper blade for contacting said outer circumference of the depth gauge wheel at an acute angle.

5. The scraper as set forth in claim 4, wherein said elongated arm is configured to position said scraper blade for contacting said outer circumference of the depth gauge wheel at a location less than approximately 90 degrees from the area of contact of said depth gauge wheel with a ground surface.

6. A scraper for a wheel used on a seed planter and mounted by a pivot arm to a frame of the seed planter to permit movement of the wheel in vertical and fore-and-aft directions, said scraper comprising:
   a scraper blade presenting an edge for contacting an outer circumference of the wheel;
   an elongated arm mounting the scraper blade;
   a mount for coupling the elongated arm with the wheel and permitting relative rotative movement between the wheel and the elongated arm to permit the arm to remain generally stationary as the wheel rotates,
   whereby said edge of the scraper blade is maintainable in contact with the outer circumference of the wheel as the wheel rotates; and
   a stabilizing member connected to the elongated arm at a position remote from the mount and presenting an elongated opening for receiving a support bolt mounted on a frame of the seed planter and permitting sliding movement of the support bolt along said member when the scraper is mounted on the wheel and said wheel moves in either the vertical or fore-and-aft direction,
   whereby said scraper blade is maintainable in contact with said outer circumference of the wheel as it moves in the vertical and fore-and-aft directions.

7. The scraper as set forth in claim 6, wherein said mount includes a hub for mounting on the wheel and a bearing assembly for coupling with the hub and which includes a shaft mounted for rotation coaxially with an axis of rotation of the wheel when the hub is mounted thereon.

8. The scraper as set forth in claim 7, wherein said scraper blade is variably positionable on said elongated arm.

9. The scraper as set forth in claim 8, wherein said elongated arm is configured to position said scraper blade for contacting said outer circumference of the wheel at an acute angle.

10. The scraper as set forth in claim 9, wherein said elongated arm is configured to position said scraper blade for contacting said outer circumference of the wheel at a location less than approximately 90 degrees from the area of contact of said wheel with a ground surface.

11. A scraper in combination with a seed planter of the type having a frame mounting a plurality of seed hoppers, soil opening blades and a depth gauge wheel positioned by a pivot arm adjacent an opening blade, said depth gauge wheel being rotatable and being movable with said pivot arm about a pivot axis, said scraper comprising:
    a scraper blade presenting an edge for contacting an outer circumference of the depth gauge wheel;
    an elongated arm mounting the scraper blade;
    a mount coupling the elongated arm with the depth gauge wheel and permitting relative rotative movement between the depth gauge wheel and the elongated arm to permit the arm to remain generally stationary as the depth gauge wheel rotates,
    whereby said edge of the scraper blade is maintainable in contact with the outer circumference of the depth gauge wheel as the depth gauge wheel rotates; and
    means for stabilizing the elongated arm at a position remote from said mount and including a member presenting an elongated opening for receiving a support bolt mounted to said frame and permitting sliding movement of the support bolt along said member when said depth gauge wheel moves about said pivot axis, whereby said scraper blade is maintainable in contact with said outer circumference of the depth gauge wheel as it pivots.

12. The scraper as set forth in claim 11, wherein said mount includes a hub mounted on the depth gauge wheel and a bearing assembly coupled with the hub and which includes a shaft mounted for rotation coaxially with an axis of rotation of the depth gauge wheel.

13. The scraper as set forth in claim 12, wherein said scraper blade is variably positionable on said elongated arm.

14. The scraper as set forth in claim 12, wherein said elongated arm is configured to position said scraper blade for contacting said outer circumference of the depth gauge wheel at an acute angle.

15. The scraper as set forth in claim 14, wherein said elongated arm is configured to position said scraper blade for contacting said outer circumference of the depth gauge wheel at a location less than approximately 90 degrees from the area of contact of said depth gauge wheel with a ground surface.

* * * * *